US006801759B1

(12) United States Patent  
Saifuddin

(10) Patent No.: US 6,801,759 B1  
(45) Date of Patent: Oct. 5, 2004

(54) METHOD AND APPARATUS FOR POWER CONTROL IN A WIRELESS COMMUNICATION SYSTEM

(75) Inventor: Ahmed Saifuddin, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 244 days.

(21) Appl. No.: 09/670,292

(22) Filed: Sep. 25, 2000

(51) Int. Cl.[7] .............................. H04B 1/00; H04Q 7/20
(52) U.S. Cl. ..................... 455/127; 455/69; 455/226.1; 455/522; 370/342; 370/345
(58) Field of Search ........................... 455/127.1, 550.1, 455/69, 67.11, 522, 572, 127.5, 453, 436, 115.1, 115.3, 226.2; 370/349, 345, 331–335

(56) References Cited

U.S. PATENT DOCUMENTS

| 5,490,167 | A | * | 2/1996 | Sumi et al. | 375/219 |
|---|---|---|---|---|---|
| 5,604,766 | A | * | 2/1997 | Dohi et al. | |
| 5,724,292 | A | * | 3/1998 | Wada | 365/207 |
| 5,982,760 | A | * | 11/1999 | Chen | 370/335 |
| 6,104,918 | A | * | 8/2000 | Saario et al. | 455/126 |
| 6,178,313 | B1 | * | 1/2001 | Mages et al. | 455/127.2 |
| 6,334,047 | B1 | * | 12/2001 | Andersson et al. | 455/69 |
| 6,351,650 | B1 | * | 2/2002 | Lundby et al. | 455/522 |
| 6,389,296 | B1 | * | 5/2002 | Shiraki et al. | 455/522 |
| 6,501,958 | B1 | * | 12/2002 | Hwang et al. | 455/522 |

FOREIGN PATENT DOCUMENTS

| EP | 0682417 A2 | | 11/1995 | | |
|---|---|---|---|---|---|
| GB | 0414352 B1 | * | 1/1996 | ........... | H04B/7/005 |
| GB | 0414352 B | * | 1/1996 | ........... | H04B/7/005 |

OTHER PUBLICATIONS

Seok Ho Won, et al., "Performance Improvement of CDMA Power Control in Variable Fading Environments," IEEE Southeastcon Engineering the New Century Proceedings, Blacksburg, VA, USA. 1997 (pp. 241–243).

Shunsuke Seo, et al., "SIR–Based Transmit Power Control of Reverse Link for Coherent DS–CDMA Mobile Radio," IEICE Transactions on Communications, Tokyo (JP). Jul. 7, 1998 (pp. 1508–1515).

Jeong Ho Kim, et al., "Performance of Single–Bit Adaptive Step Size Closed–Loop Power Control Scheme in DS–CDMA Systems," IEICE Transactions on Communications, Tokyo (JP). Jul. 7, 1998 (pp. 1548–1552).

Szu–Lin Su et al., "Reverse–Link Power Control Strategies for CDMA Cellular Network," IEEE International Symposium on Personal, Indoor and Mobile Radio Communications, 1995, vol. 2, Sep. 27, 1995, pp. 461–465.

M. P. J. Baker et al., "Power Control in UMTS Release '99," International Conference on 3G Mobile Communication Technologies, No. 471, Mar. 27–29, 2000, pp. 36–40.

* cited by examiner

Primary Examiner—Erika Gary
Assistant Examiner—Kamran Afshar
(74) Attorney, Agent, or Firm—Philip R. Wadsworth; Thien T. Nguyen; Sandra L. Godsey

(57) ABSTRACT

In a wireless communication system a method for power control in a mobile unit, wherein a variable size step is used to adjust the transmit power. The method compares a current power control signal to a previous one, and incrementally changing the step size for no change The adjusted step size is compared to maximum and minimum values to maintain a predetermined step size range. In one embodiment, a mobile unit includes a memory storage device and a comparator for storing the power control signals and comparing them.

23 Claims, 5 Drawing Sheets

-- PRIOR ART --

METHOD AND APPARATUS FOR POWER CONTROL IN A WIRELESS COMMUNICATION SYSTEM

FIELD

The present invention relates to wireless data communication. More particularly, the present invention relates to a novel and improved method and apparatus for power control in a wireless communication system.

BACKGROUND

In a wireless communication system, power control is used to ensure that the reverse channel signals from mobile users are centrally received at approximately the same power level. In a Code Division Multiple Access (CDMA) system particularly, power control prevents one user from interfering with those sharing a same Radio Frequency (RF) band. Power control adjusts the transmit power of each mobile unit so that each mobile unit achieves an acceptable Signal-to-Noise Ratio (SNR). In other words, power control seeks to solve the "near-far" problem in spread-spectrum multiple access systems and thus increase capacity of the system.

In practice, the power control seeks to adjust the transmit power in response to the effects of fading. Ideally, the power control adjustments allow the mobile unit to track the fading, and provide sufficient power to achieve a desired SNR and overcome the effects of fading, while at the same time avoiding the use of excess power that interferes with other users.

Traditional methods of power control provide power control adjustments at a fixed step size. Several methods determine the step size based on analysis of power as a function of vehicular speeds, as fading is typically a function of the movement of the mobile unit. A problem exists in the delay between a probe of the transmitted signal and the adjustment of transmit power. The delay is introduced by the time required for the base station to receive and analyze the transmitted signal from the mobile unit, the time to generate a power control signal from the base station, and the time for the mobile unit to make the adjustment indicated by the power control signal. The fixed step size does not accurately track the fading over all speeds.

Therefore, a need exists for a method for power control that accurately tracks the channel fading and provides adjustments that adapt to changing conditions.

SUMMARY

The disclosed embodiments provide a novel and improved method for power control in a wireless communication system. In one embodiment, a CDMA wireless communication system implements a method for power control using a variable step size adjustment. The power control signal transmitted from the base station indicates whether the transmit power of the mobile unit is to increase or decrease. Step size refers to the size of the change in transmit power effective in response to the power control signal. At the mobile unit, the process compares each received power control signal to at least one (1) previously received power control signal from the transmitter. If the comparison is TRUE, i.e., the previous power control signal is the same sign as the current power control signal, an increment/decrement value is added to the step size. Otherwise, the step size is returned to a default value. In one embodiment, the method has a maximum step size that determines a ceiling and a minimum step size that determines a floor. In the exemplary embodiment, the default values are determined by the polarity of the direction change. In other words, increases following a decrease are treated differently than decreases following an increase. Additionally, step sizes associated with power increases are incrementally increased. Step sizes associated with power reductions are incrementally decreased. The diversity of approach provides smart tracking that allows the mobile unit to track the fading at the receiver more quickly. The power control signal received from the base station is used to make these step size decisions without requiring any modifications to the base station generated signal.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

In an exemplary embodiment of the present invention, a CDMA wireless communication system implements a power control method implementing a variable step size. The method is implemented at a mobile unit without modification to a base station.

Figure 1:
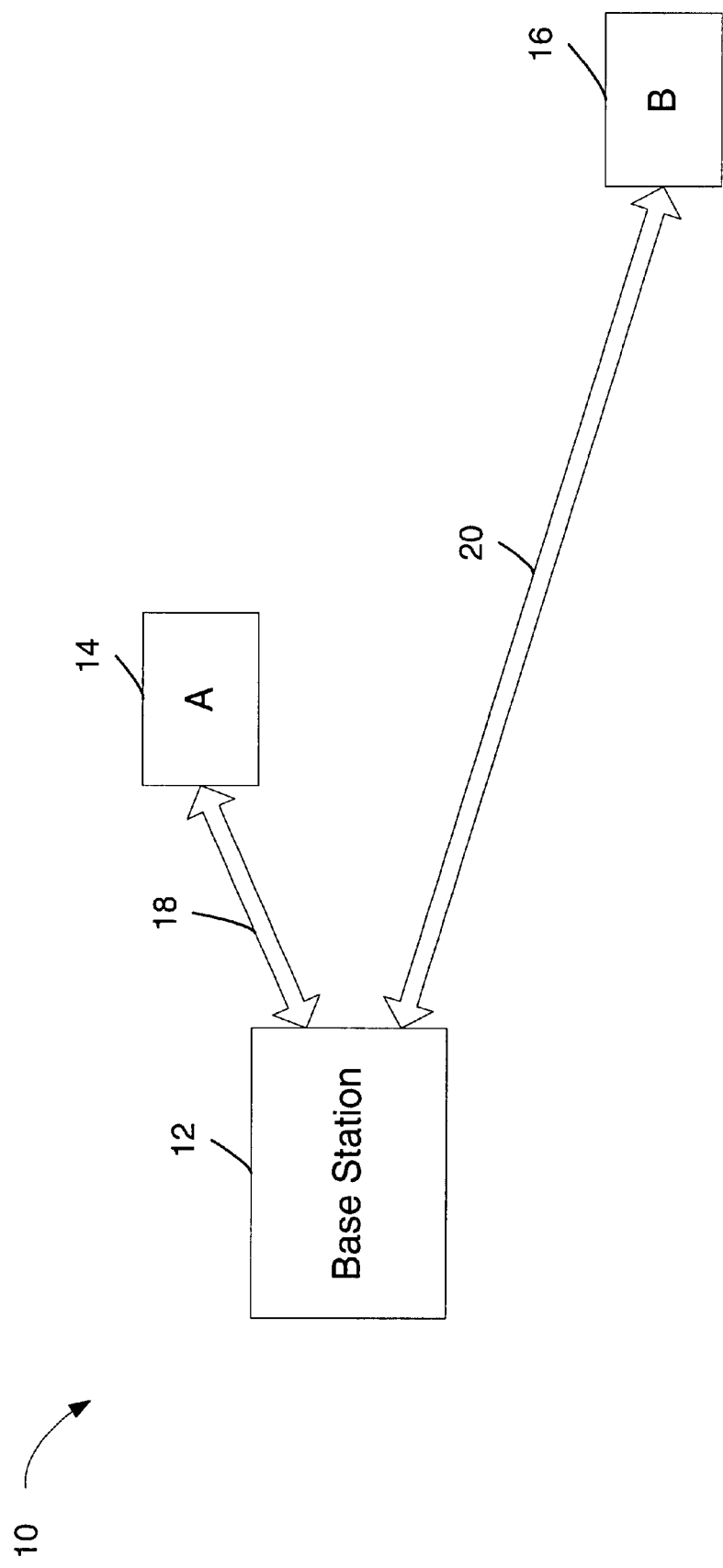
FIG. 1 illustrates a wireless communication system according to one embodiment.

FIG. 1 illustrates an exemplary embodiment of a wireless communication system 10 having a base station 12, mobile unit A 14, and mobile unit B 16. Forward and reverse channels 18, 20 couple the base station 12 to A 14 and B 16, respectively. In an exemplary embodiment, system 10 is a Code Division Multiple Access (CDMA) wireless system, consistent with "TIA/EIA/IS-2000 Standards for cdma2000 Spread Spectrum Systems" referred to as "the cdma2000 standard." In alternate embodiments, the system 10 may be a system consistent with the "TIA/EIA/IS-95 Mobile Station-Base Station Compatibility Standard for Dual-Mode Wideband Spread Spectrum Cellular System," hereinafter referred to as "the IS-95 standard," or other systems employing power control at receivers, such as the "ANSI J-STD-01 Draft Standard for W-CDMA (Wideband Code Division Multiple Access) Air Interface Compatibility Standard for 1.85 to 1.99 GHz PCS Applications" referred to as "W-CDMA," or other systems generally referred to as High Data Rate (HDR) systems.

In the wireless system 10 of FIG. 1, the mobile units A14 and B 16 communicate with the base station 12 via a common RF band. Power control signals are generated from the base station 12 to control the transmit power of each of A 14 and B 16 so as to reduce the interference experienced by both. The mobile units A14 and B 16 are typically moving within system 10 with respect to base station 12.

Without power control, the base station 12 receives more power from a proximate mobile unit 14, 16, and, therefore, a signal from A 14 is expected to be received having more power than a received signal from B 16. The base station 12 thus implements power control to allow each mobile user 14, 16 to provide signals having sufficient SNR, to overcome the near-far problem.

The base station 12 transmits power control signals on the forward channels of links 18, 20 in response to the signals received from A 14 and B 16, respectively. The base station 12 periodically determines the relative strength of each received signal and sends a power control signal instructing the corresponding mobile unit 14, 16 to adjust the transmit power accordingly. The power control signals are generated once every power control group period "T." In one embodiment, the base station generates the power control signals at 800 Hz, where T is equal to 1.25 ms. As the power control signal instructs the mobile unit 14, 16 to increase or decrease transmit power, the power control signal effectively indicates the direction of the power change. In an exemplary embodiment, each power control signal is a single bit. A "1" corresponds to a decrease instruction, and a "0" corresponds to an increase instruction. In response to receipt of each power control signal, the mobile unit 14, 16 adjusts the amplifier accordingly. Alternate embodiments may implement any other scheme that identifies the instruction.

Figure 2:
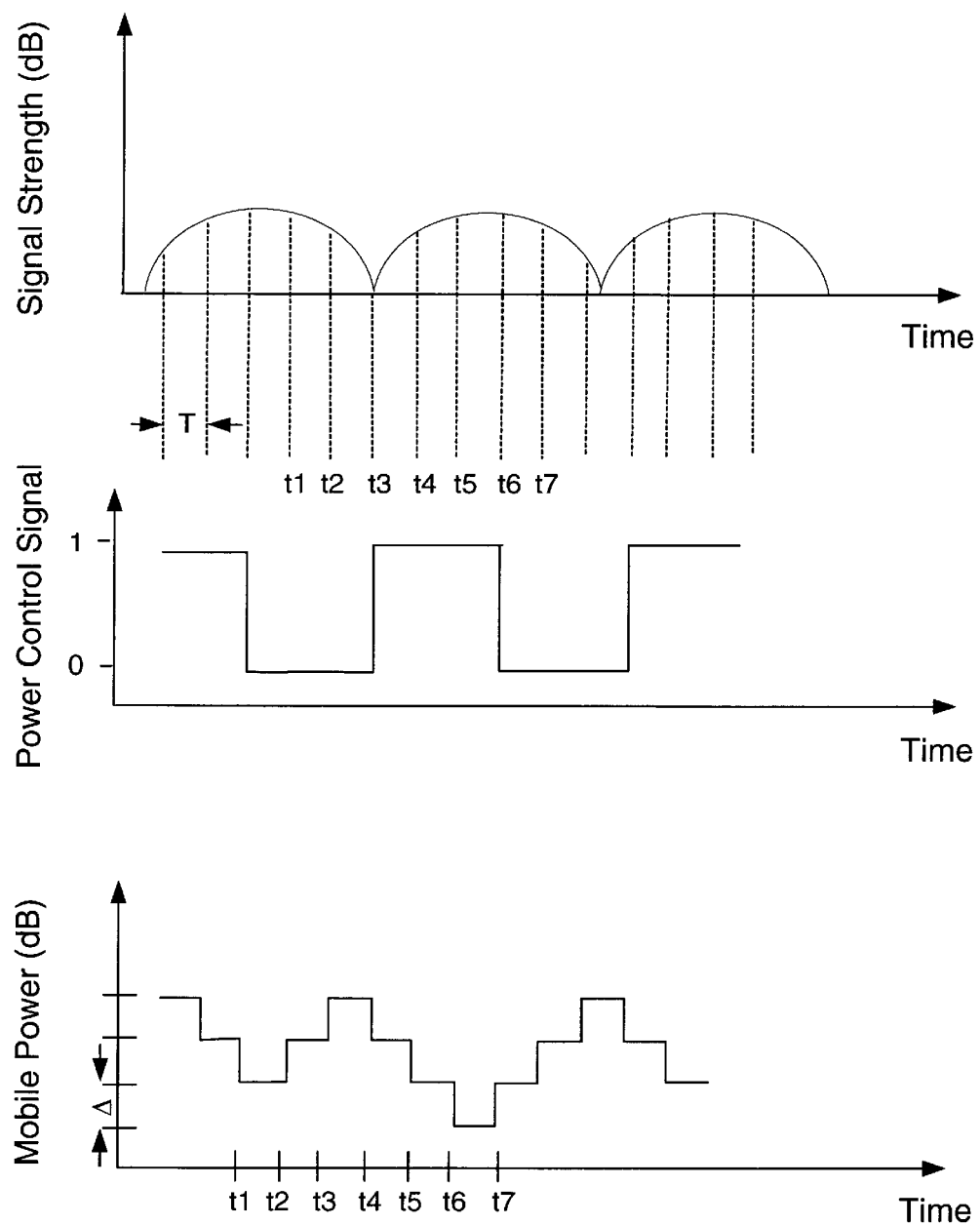
FIG. 2 illustrates channel fading at a mobile unit in a wireless communication system of one embodiment.

As illustrated in FIG. 2, the signal strength of a mobile unit, such as A 14 and B 16, is time-varying. The illustrated pattern is mainly a result of fading, or drops in amplitude, due to constructive and destructive interference of the many signal paths within system 10. A mobile unit 14, 16 experiences fading with movement through the field of a base station 12. The signal strength is graphed as a function of time. Superimposed on the plot of signal strength is the power control group period T. Every period T, the base station 12 checks the signal strength received and sends a power control signal. Each power control signal is actually delayed from a corresponding instance of the signal. This presents one of the challenges of power control: accurately tracking the fading of the transmit signal in real-time.

FIG. 2 does not consider the delay, but for clarity places the corresponding power control signals below each instance of the signal. While the signal strength is increasing, the power control signal instructs the mobile unit to decrease power. This avoids the introduction of excess power that affects other users. When the signal strength is decreasing, the power control signal instructs an increase. As illustrated, the power control signal toggles between a "1" and a "0." Note that in practice, wireless systems often use a (−1V) for a "1" and a (+1V) for a "0." Alternate methods may be used to provide the instruction to a mobile unit 14, 16, such as using multiple bits or using different voltage assignments. The method of power control is not dependent on the actual instantiation of the power control signal, but rather, such specific information is a priori knowledge to the mobile unit 14, 16. Note that the specifics of the power control signal may be negotiated during a start up sequence.

Continuing with FIG. 2, below the plot of the power control signal, the transmit power of the mobile unit 14, 16 is illustrated. Traditionally, the transmit power adjusts in response to the power control signal, wherein the power level decrements one fixed step, Δ, in response to a "1" and increments by Δ in response to a "0." The step size is often specified in dB.

Figure 3:
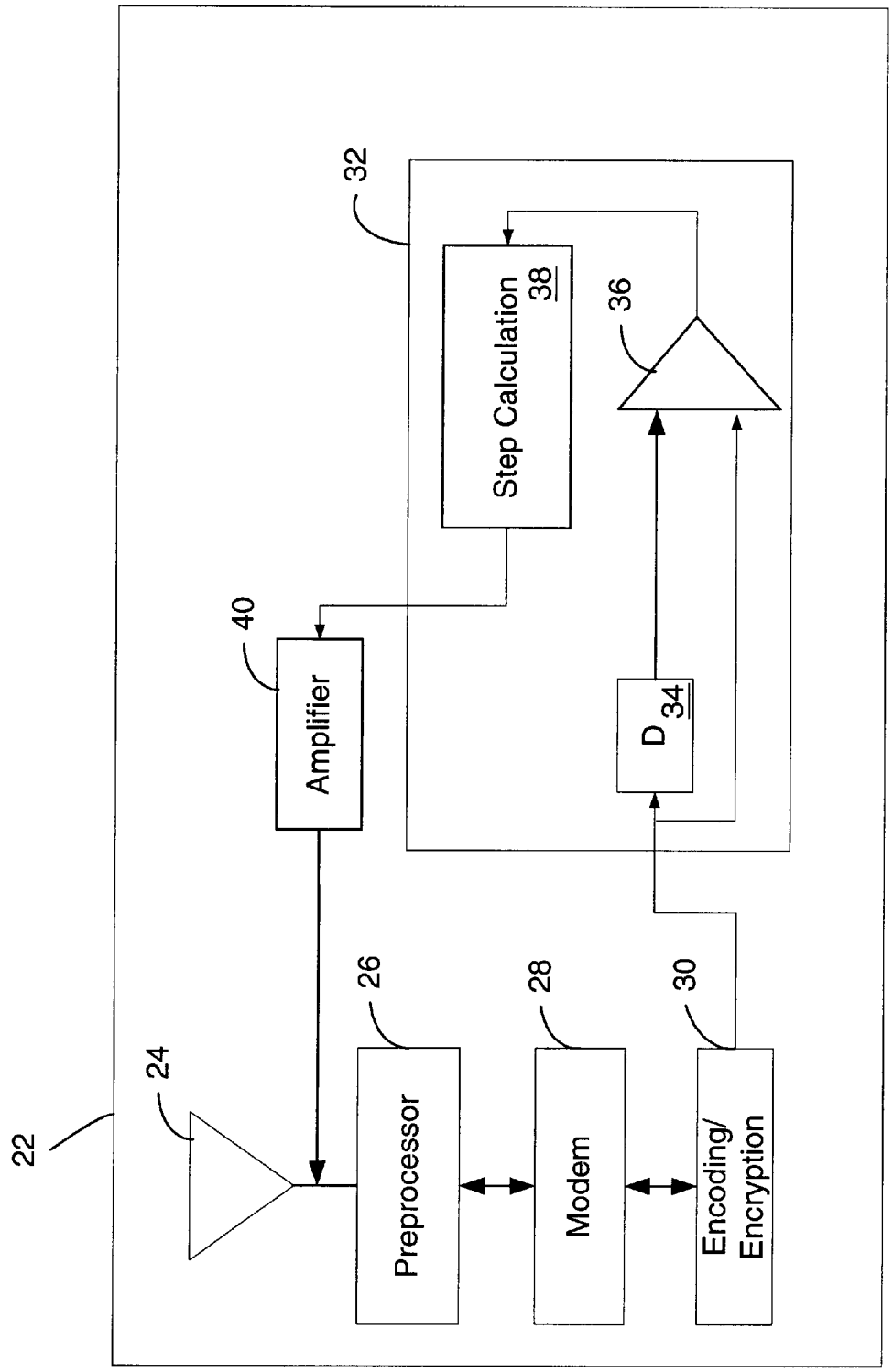
FIG. 3 illustrates a mobile unit according to one embodiment.

Each mobile unit 14, 16 in the exemplary embodiment responds to the power control signals from the base station 12 using an adaptive method of adjusting the transmit power level. An exemplary mobile unit 22 is illustrated in FIG. 3. The mobile unit 22 is applicable to wireless system 10 of FIG. 1. The mobile unit 22 includes an antenna 24 coupled to a preprocessor 26. The preprocessor 26 receives the modulated signal and performs filtering necessary for further processing in mobile unit 22. Such preprocessing extracts the signal intended for the mobile unit 22, and despreads the frequency, decoding the received signal. For transmission, the preprocessor 26 spreads the frequency. The preprocessor 26 is coupled to a modem 28, which demodulates the received signal to extract the information. Note that the modem 28 also modulates outgoing signals onto a predetermined carrier frequency. The modem 28 is further coupled to an encoding/encryption unit 30 that performs corresponding functions.

After the initial processing described above, the mobile unit 22 provides a resultant power control signal to power control adjuster 32. The power control adjuster 32 includes a delay element 34. The delay element 34 is a memory storage device and may be implemented as a flip-flop, shift register, or any other read/write memory, including, but not limited to, random access memory (RAM), dynamic RAM (DRAM), static RAM (SRAM), FLASH memory, electrically erasable programmable read only memory (EEPROM), etc.

The delay element 34 provides historical power control signal information for each current iteration. The current power control signal, PC(i), and the previous power control signal, PC(i−1), which is stored in delay element D 34, are provided to a comparator 36. Comparator 36 compares the power control signal values PC(i) and PC(i−1) to identify a change in direction of the power control instructions. The output of comparator 36 determines the step adjustment made to the transmit power of mobile unit 22. In an exemplary embodiment, the comparator 36 selects one of four (4) adjustment instructions, illustrated in Table 1 hereinbelow. The step calculation unit 38 calculates the necessary adjustment. If the direction of adjustment is the same, the size of the step is incrementally adjusted. A maximum value, MAX, provides a ceiling for the absolute value of the step size, while a minimum value, Δ, provides a floor. In the exemplary embodiment, adjustments that successively increase the transmit power level are treated differently than adjustments for successive decreases. For increases, the first step upward is set to Δ, wherein for subsequent upward steps, the step size is incrementally increased. For decreasing the transmit power level, the first step is set to Δ, the second successive DN step is set to MAX, and for subsequent successive DN steps, the step size is incrementally decreased. The output of the step calculation unit 38 causes the specific adjustment to amplifier 40, coupled to antenna 24. The mobile unit 22 may include any number of other modules for communicating and computing. Alternate embodiments may implement other adjustment schemes, such as where both directions are similarly treated and only a maximum or minimum value is required. For adjustment schemes with fewer adjustment options, a comparator may be implemented as an "OR" gate, or other two (2) decision device. Also, in alternate embodiments, the function of comparator 36 and step calculation unit 38 in the exemplary embodiment may be combined in one unit, or implemented in software, dedicated hardware, firmware, or a combination thereof.

Figure 4:
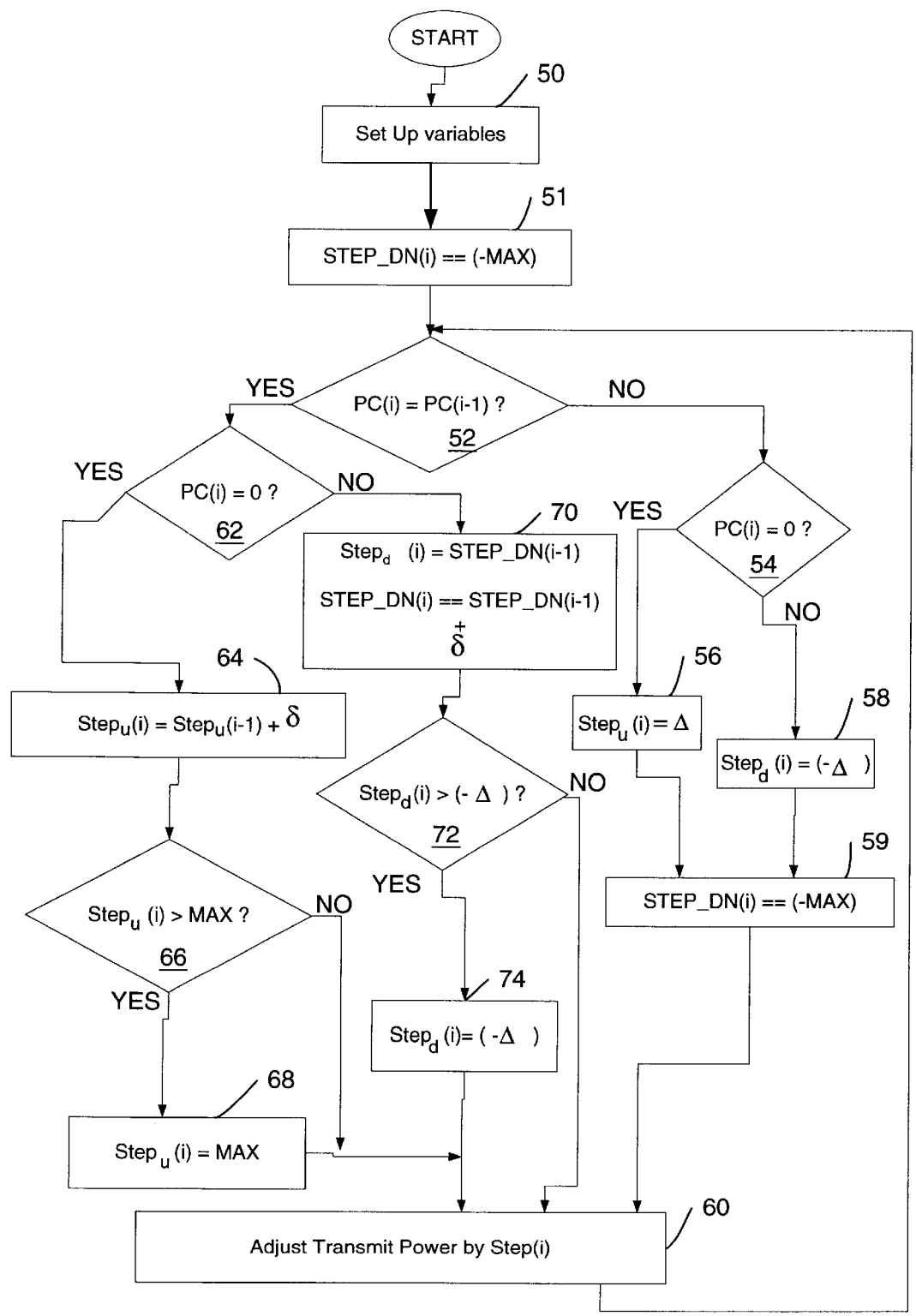
FIG. 4 illustrates a method for power control according to one embodiment.

An exemplary embodiment uses a method of power control illustrated in FIG. 4. After negotiation with a base station, mobile unit 22 initializes power control variables and information in step 50. Initialized variables, constants, and values include, but are not limited to, the minimum and maximum step size(s), and the increment value(s). At step 51 the process sets a variable "STEP_DN" equal to (−MAX), the negated MAX value. The STEP_DN variable is the step size resulting from a second decrease instruction following a change in direction.

The mobile unit 22 then begins receiving power control signals. For iteration i, the power control signal PC(i) is compared to the last received power control signal PC(i−1) in decision 52. A difference indicates a direction change, such as occurs at time t1 of FIG. 5. The process then determines if the current instruction is to increase or decrease the transmit power in decision 54. According to the scheme of the exemplary embodiment, a "0" is an increase, or "UP" command, and a "1" is a decrease, or "DN" command. For an UP adjustment, the step size, indicated as "$Step_u(i)$," is set to the minimum value, $\Delta$ in step 56. For a DN adjustment, the step size, indicated as "$Step_d(i)$," is set to the negated minimum value (−$\Delta$) in step 58. The variable STEP_DN is then adjusted to the maximum value, (−MAX) in step 59. This assures that for a power control direction change, the first step down is, (−$\Delta$) and the second step down is (−MAX). The DN power control adjustments reduce the power starting at a minimum adjustment to avoid spurious spikes in the signal strength, and then apply a maximum adjustment to optimize the avoidance of transmitting at excess power. If the signal strength results in two (2) consecutive DN instructions, then the trend is most likely real and the power should be decreased. After reinitializing STEP_DN, the process then applies the appropriate step size to adjust the transmit power in step 60.

Note that for a series of consecutive UP commands, the step size, $Step_u(i)$, increases from a minimum value, $\Delta$, to a maximum value, MAX. For a series of DN commands, the step size, $Step_d(\ )$, starts with a minimum value, (−$\Delta$), to avoid any potential spurious changes in signal strength, and then applies the maximum step size, (−MAX), to the next consecutive DN step. From here, for further DN steps, the process continues to gradually decrease the step size until it reaches a minimum size, (−$\Delta$). Note that for UP steps the absolute value of the step size incrementally increases, and for DN steps, the absolute value of the step size incrementally decreases. Alternate embodiments may implement a common scheme wherein the absolute value of the step size incrementally changes in a similar manner for both UP and DN step sizes. The scheme chosen by a designer depends on the speeds considered, as some schemes have better performance over particular ranges of speeds.

Continuing with FIG. 4, if there is no direction change in decision 52, the process continues to determine the direction in decision 62. For an UP adjustment, the process increments the previous step size by an increment value $\delta$ in step 64. The increment value may be determined heuristically based on previous system performance. In one embodiment, $\delta$ is calculated based on a history of received power control signals for the mobile unit. The incremented step size, $Step_u(i)$, is evaluated in comparison to a ceiling value, MAX, in decision 66. If $Step_u(i)$ is less than or equal to MAX, processing continues to step 60 to adjust the transmit power. If the $Step_u(i)$ is greater than MAX, then $Step_u(i)$ is set equal to MAX in step 68, and the process continues to step 60.

For a DN adjustment, processing from decision 62 continues to step 70, wherein the process sets $Step_d(i)$ equal to the variable STEP_DN, and then increments STEP_DN by the increment value, $\delta$. Alternate embodiments may use different increment values for UP and DN adjustments. The calculated step size is then compared to a minimum value, (−$\Delta$) in decision 72. If $Step_d(i)$ is less than or equal to (−$\Delta$), processing continues to step 60 to adjust the transmit power. If the $Step_d(i)$ is greater than (−$\Delta$), then $Step_d(i)$ is set equal to (−$\Delta$) in step 74, and the process continues to step 60 to adjust the transmit power.

Table 1 summarizes the step size adjustments calculated in response to inputs to the comparator 36 according to an exemplary embodiment.

TABLE 1

| PC(i − 1) | PC(i) | Step Size |
|---|---|---|
| 0 | 0 | Step(i − 1) + $\delta$ |
| 0 | 1 | −$\Delta$ |
| 1 | 1 | STEP_DN(i − 1) |
| 1 | 0 | $\Delta$ |

Figure 5:
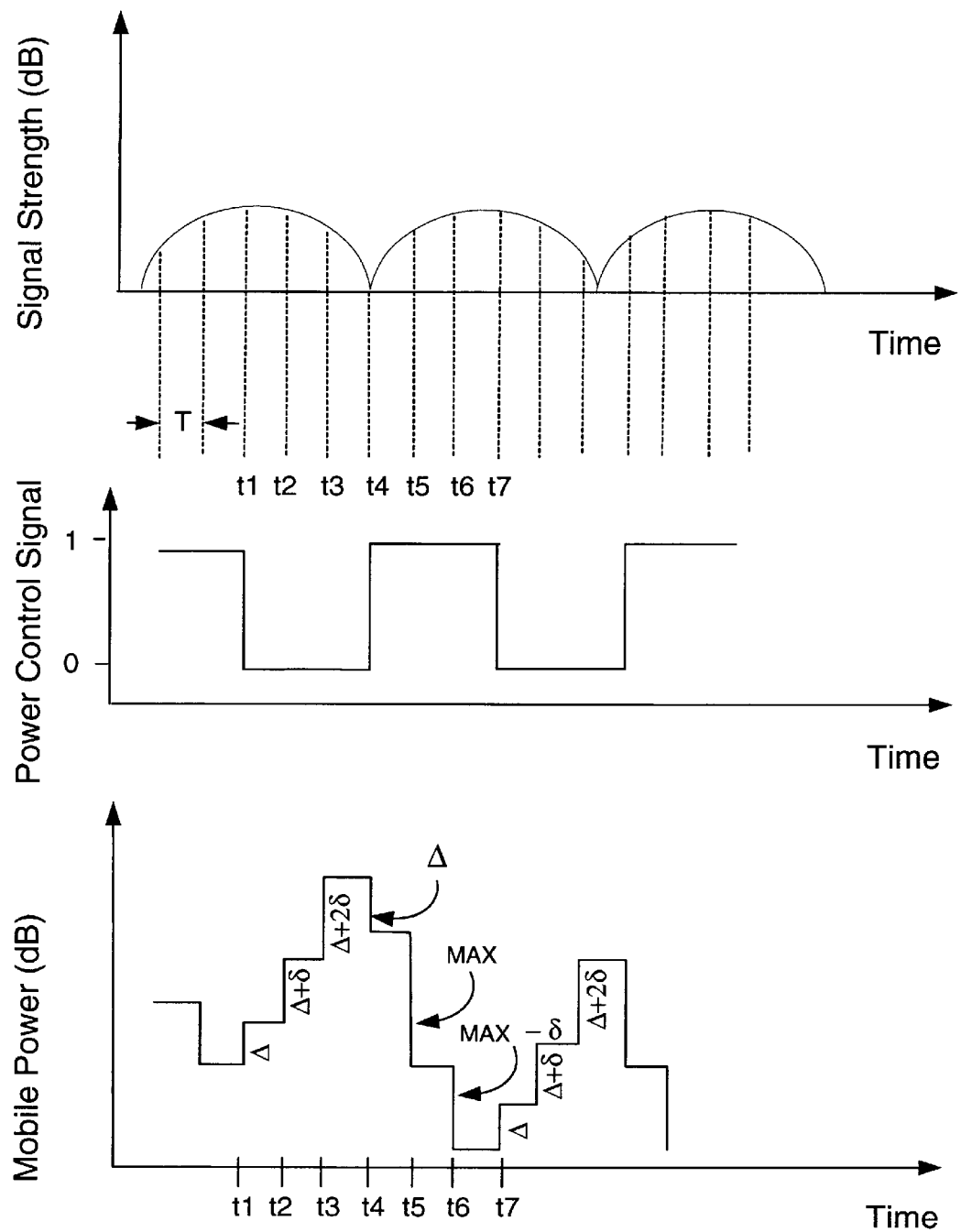
FIG. 5 illustrates step size adjustments in response to channel fading according to an exemplary embodiment.

FIG. 5 illustrates an application of the method of FIG. 4, applied to a mobile unit 22 for a signal strength as illustrated in FIG. 2. The following initial values were set to the following unitized values for an exemplary embodiment:

$\delta$=0.2;

$\Delta$=1;

MAX=2.

As illustrated, the resultant power level pattern is different from that illustrated in FIG. 2. The increment value is listed to the right of the step. A change of direction from DN to UP occurs at time t1, where the initial UP step size is given as $\Delta$. The next step UP occurs at time t2 and has a step size of $\Delta$+$\delta$, incremented from the previous step. The next step UP occurs at time t3 and has a step size of $\Delta$+2$\delta$, incremented again. As illustrated, for successive UP steps the step size increases. A change of direction from UP to DN is illustrated at time t4, where the first DN step has a step size given as (−$\Delta$). The next DN step is at time t5 having a step size (−MAX). This DN step is followed by another DN step, wherein successive steps would have sizes, MAX-$\delta$, and MAX-2$\delta$, respectively, such as occurs at times t6. Although not illustrated, from time t6, successive DN steps would result in decreasing step sizes. At time t7 there is a direction change from DN to UP. At this point, the step size returns to a minimum, $\Delta$. Successive UP steps then increment by $\delta$. The pattern illustrated is intended to more accurately and quickly track the fading experienced at the mobile unit 22. Note that while not illustrated, the incremental step size adjustments do not continue to increase/decrease without limit. For UP adjustments, the step size reaches a maximum value MAX and does not increase further for successive UP steps. Similarly, for DN adjustments, the step size reaches a minimum value (−$\Delta$) and remains there on further successive DN steps. When the process reaches a maximum or a minimum step size, the only change in step size occurs for changes in direction. Note that alternate embodiments may vary the step size once a limit is reached.

Alternate embodiments may implement any number of values for the increment, minimum, and maximum variables. Additionally, these values may be dynamic values, adjusted based on performance of the mobile unit 22. Alternate embodiments may treat step adjustment in a similar manner for both directions, wherein one scheme is used rather than the diverse approach of the exemplary embodiment.

Note that the power control adjustment of one embodiment does not require additional information from the base station. Similarly, it is not necessary for the base station to have knowledge of the specific method of power control adjustment at the mobile unit 22. A wireless system may include mobile units 22 implementing a variety of power control adjustment methods.

While the exemplary embodiment has been detailed with respect to a spread spectrum system, and a CDMA system specifically, various embodiments of the present embodiment are applicable to any wireless system in which power control is used to control the transmit power of mobile users within a network. Note that a mobile unit may provide feedback information to a base station, allowing the base station to adjust the period T or in some other way assist the mobile in effectively tracking the fading experienced in the field. Such a base station may use this type of information from multiple mobile units within a system.

Thus, a novel and improved method and apparatus for transmit power control in a wireless communication system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A wireless communication apparatus, comprising:
   a memory storage device operative to receive and store a first power control indicator, the first power control indicator having an associated first step size;
   a comparator coupled to the memory storage device, operative to receive a second power control indicator, the comparator operative to receive the first power control indicator from the memory storage device, and operative to compare the second power control indicator to the first power control indicator stored in the memory storage device; and
   a step adjustment unit responsive to the comparator, operative to calculate a second step size by incrementing the first step size by a predetermined increment value when the first and second power control indicators are a same value, the predetermined increment value determined in response to a power adjustment step size, sigma, and a multiple of an offset increment, delta.

2. The apparatus of claim 1, further comprising:
   an amplifier coupled to the step adjustment unit operative to adjust transmit power in response to the first and second power control indicators.

3. The apparatus of claim 1, wherein the step adjustment unit is operative to calculate the second step size by setting the second step size to a predetermined value when the first and second power control indicators are different.

4. The apparatus of claim 3, wherein the predetermined increment value is a positive value for increasing transmit power and a negative value for decreasing transmit power.

5. The apparatus of claim 3, wherein the predetermined increment value is a same absolute value for increasing transmit power and decreasing transmit power.

6. The apparatus of claim 1, wherein the memory storage device comprises:
   a flip-flop device.

7. The apparatus of claim 1, wherein:
   if the first and second power control indicators correspond to an increase in transmit power, the predetermined increment value is a first value; and
   if the first and second power control indicators correspond to an decrease in transmit power, the predetermined increment value is a second value different from the first value.

8. The apparatus of claim 1, wherein the apparatus is operative within a Code Division Multiple Access wireless system.

9. The apparatus of claim 1, wherein the first and second power control indicators comprise at least one bit indicating a polarity for adjusting transmit power of the apparatus.

10. The apparatus of claim 9, wherein the memory storage device is operative to store the second power control indicator.

11. In a wireless communication system, a method comprising:
   receiving a first power control indicator;
   storing the first power control indicator;
   determining a first power adjustment step size, sigma;

receiving a second power control indicator;

comparing the first and second power control indicators; and if the first and second power control indicators are a same value, adding an increment value to the first power adjustment step size, sigma, to produce a second power adjustment step size, the increment value being a multiple of a predetermined offset increment, delta.

12. The method of claim 11, further comprising:

if the first and second power control indicators are different values, setting the second power adjustment step size to a predetermined value.

13. The method of claim 12, wherein the setting further comprises:

if the first power control indicator corresponds to an instruction to increase transmit power, the predetermined value is a maximum step size; and if the first power control indicator corresponds to an instruction to decrease transmit power, the predetermined value is a minimum step size.

14. The method of claim 11, wherein the adding further comprises:

if the first and second power control indicators correspond to an instruction to increase transmit power, the increment value is a positive value.

15. The method of claim 14, wherein the adding further comprises:

if the first and second power control indicators correspond to an instruction to decrease transmit power, the increment value is a negative value.

16. A wireless transceiver, comprising:

a memory storage device operative to receive and store a first power control indicator to form a stored first power control indicator, the first power control indicator having an associated first step size; and a step adjustment unit operative to compare a successive first power control indicator to the stored first power control indicator stored in the memory storage device, and operative to calculate a second step size greater than the first step size for increasing transmit power and less than the first step size for decreasing transmit power, the second step size associated with the successive first power control indicator, each step size determined in response to a power adjustment step size, sigma, and a multiple of an offset increment, delta.

17. The transceiver of claim 16, wherein the step adjustment unit is operative to set the second step size to a first predetermined value for a change from increasing to decreasing transmit power and to a second predetermined value for a change from decreasing to increasing transmit power.

18. The transceiver of claim 17, wherein the first predetermined value is a minimum step size.

19. The transceiver of claim 18, wherein after a change from increasing to decreasing transmit power, the step adjustment is operative to set a third predetermined value corresponding to a maximum step size.

20. The transceiver of claim 19, wherein in response to successive instructions to decrease transmit power, the step adjustment is operative to decrement the third predetermined value down to a minimum step size.

21. The transceiver of claim 16, further comprising:

an amplifier coupled to the step adjustment unit and responsive to the first and second step sizes.

22. A wireless communication apparatus, comprising:

means for receiving a first power control indicator;

means for storing the first power control indicator;

means for determining a first power adjustment step size, sigma;

means for receiving a second power control indicator;

means for comparing the first and second power control indicators; and means for adding an increment value to the first power adjustment step size, sigma, to produce a second power adjustment step size if the first and second power control indicators are a same value, the increment value being a multiple of a predetermined offset increment, delta.

23. The wireless communication apparatus as in claim 22, further comprising:

means for setting the second power adjustment step size to a predetermined value if the first and second power control indicators are different values.

* * * * *